United States Patent [19]

Miyamoto et al.

[11] Patent Number: 4,501,490

[45] Date of Patent: Feb. 26, 1985

[54] COPYING APPARATUS

[75] Inventors: Koichi Miyamoto, Tokyo; Yoshinobu Tonomura, Hachiohji, both of Japan

[73] Assignee: Canon Kabushiki Kaisha, Tokyo, Japan

[21] Appl. No.: 627,520

[22] Filed: Jul. 3, 1984

Related U.S. Application Data

[63] Continuation of Ser. No. 378,742, May 17, 1982, abandoned.

[30] Foreign Application Priority Data

May 21, 1981 [JP] Japan ................................ 56-77070

[51] Int. Cl.[3] ........................................ G03B 27/52

[52] U.S. Cl. .................................. 355/55; 355/14 R

[58] Field of Search ..................... 355/55, 56, 57, 58, 355/14 R

[56] References Cited

U.S. PATENT DOCUMENTS

| | | | |
|---|---|---|---|
| 3,829,209 | 8/1974 | Buddendeck et al. | 355/57 |
| 3,967,896 | 7/1976 | Looney et al. | 355/57 |
| 4,116,554 | 9/1978 | Libby et al. | 355/57 |
| 4,120,578 | 10/1978 | Daniels et al. | 355/57 |
| 4,162,844 | 7/1979 | Traister et al. | 355/14 R |
| 4,187,024 | 2/1980 | Satomi et al. | 355/14 R |
| 4,353,643 | 10/1982 | Statt | 355/57 |

*Primary Examiner*—Monroe H. Hayes

*Attorney, Agent, or Firm*—Fitzpatrick, Cella, Harper & Scinto

[57] ABSTRACT

A copying apparatus provides that the magnification of a copy image of an original is reduced correspondingly to the width of a binding margin, so that when the formation of the binding margin on one edge portion of a transfer medium has been instructed, a part of the copy image does not extend beyond the other edge portion of the transfer medium, that is, all the area of the original is copied on an area of the transfer medium other than the binding margin.

7 Claims, 10 Drawing Figures

COPYING APPARATUS

This application is a continuation of application Ser. No. 378,742 filed May 17, 1982, now abandoned.

BACKGROUND OF THE INVENTION

1. Field of the Invention

This invention relates to a copying apparatus which can form a binding margin on one edge portion of a transfer medium.

2. Description of the Prior Art

Forming a binding margin on one edge portion of a transfer medium is very convenient for putting documents in order because it permits apertures for filing to be formed in such binding margin. Copying apparatus are known in which a binding margin is formed on one edge portion of a transfer medium with the position of the copy image shifted on the transfer medium. However, where the original to be copied has information such as characters or figures from end to end, if the position of the copy image is laterally shifted on the transfer medium to provide for a binding margin on the transfer medium, a part of the original image will be beyond the transfer medium and part of the characters or figures occupying one end of the original will fail to be copied.

SUMMARY OF THE INVENTION

It is an object of the present invention to overcome the above-noted inconvenience peculiar to the copying apparatus of the prior art.

It is another object of the present invention to provide a copying apparatus which can form a binding margin on transfer mediums and in which the original image does not protrude out of the transfer mediums.

It is still another object of the present invention to provide a copying apparatus in which the width of the binding margin formed on transfer mediums is variable and moreover, any original can be copied fully on the transfer mediums.

The invention will become fully apparent from the following detailed description thereof taken in conjunction with the accompanying drawings.

DESCRIPTION OF THE PREFERRED EMBODIMENTS

Figure 1:
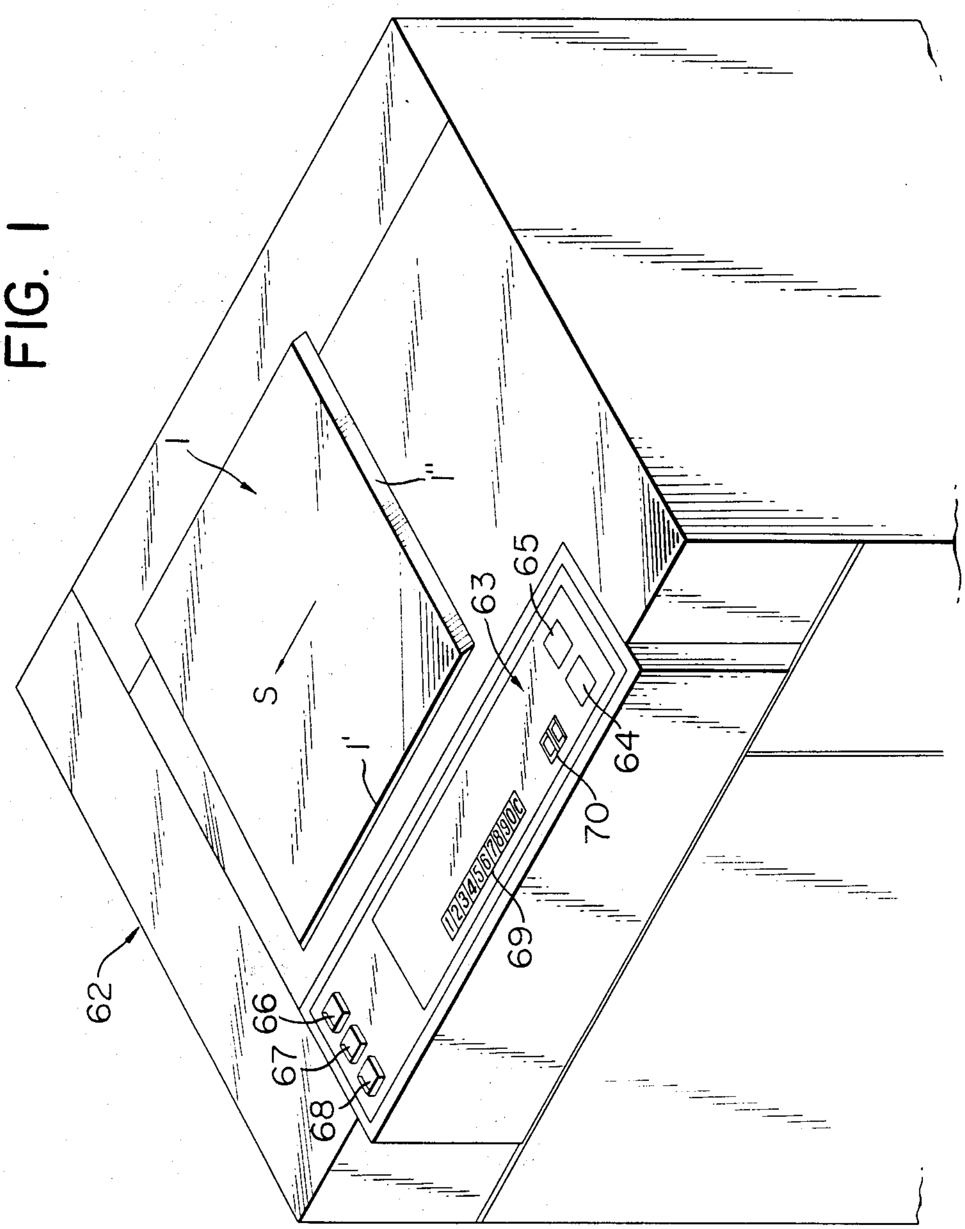
FIG. 1 shows a part of the appearance of the copying apparatus according to the present invention.

Referring to FIG. 1, various control keys are arranged on the operating panel 63 of a copying apparatus outer housing 62 containing therein various means and members to be described. Designated by 64 is a copy key. By depressing this key 64, a drum is rotated as will hereinafter be described, and an original placed on an original supporting table 1 is scanned, and a copy of the original is obtained through the electrophotographic process which will hereinafter be described. Denoted by 65 is a both-side copy instructing key. By depressing this key 65, copy images can be formed on both sides of transfer paper as will hereinafter be described.

Keys 66, 67, 68 and numeric key group 69 are the keys for controlling motors 28 and 56 to be described, and the keys 66, 67 and the key group 69 also control a motor 33 to be described, and the key 68 and the key group 69 also control a timer 60 to be described.

Figures 6A, 6B, 6C:
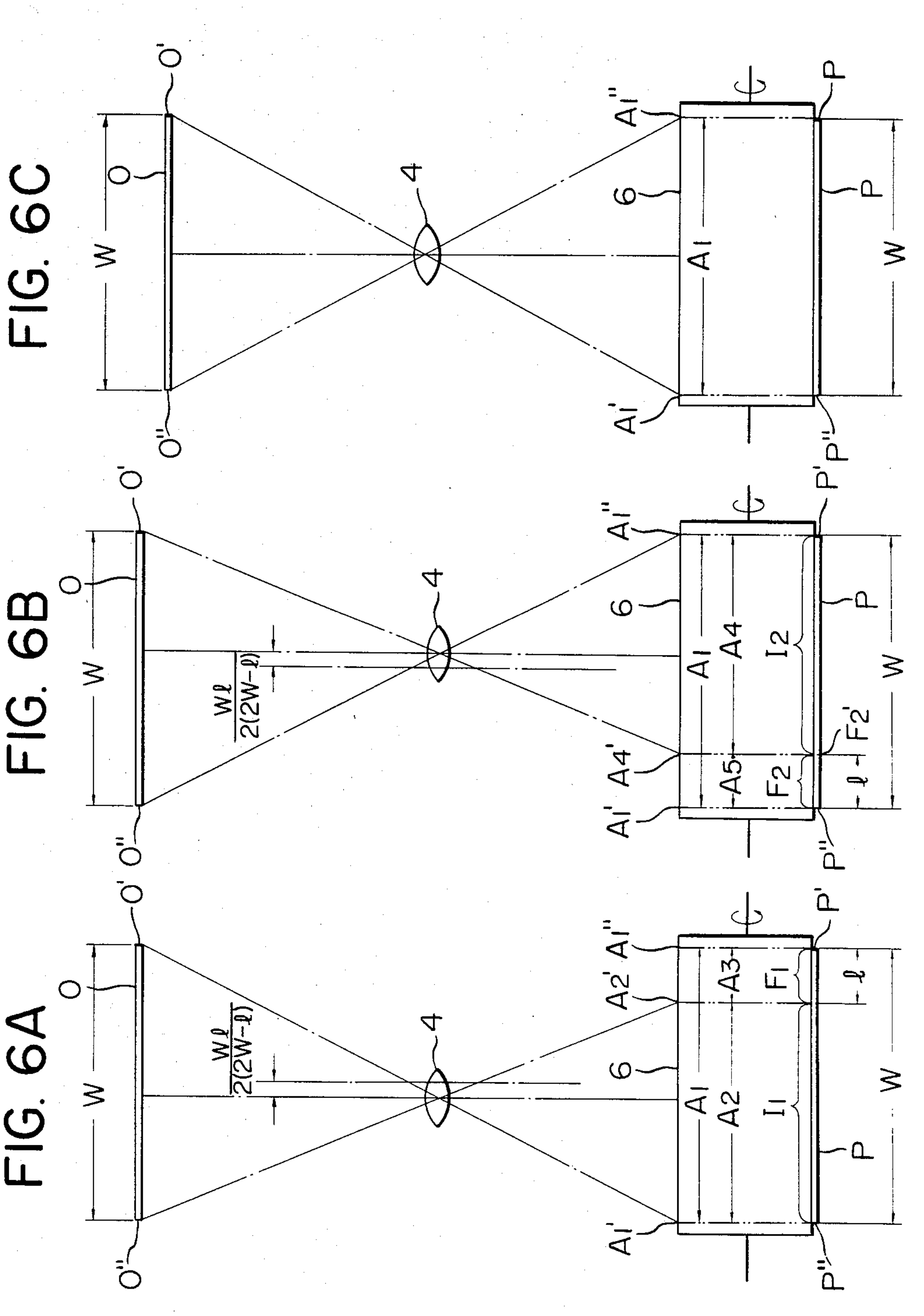
FIGS. 6A, 6B and 6C are developed views of the optical path when a part of the FIG. 1 apparatus is seen in the direction X.

When the key 66 is depressed, there is formed a binding margin on the right end portion of transfer paper; when the key 67 is depressed, there is formed a binding margin on the left end portion of transfer paper; and when the key 68 is depressed, there is formed a binding margin on the leading end portion of transfer paper. The key group 69 sets the width of the said binding margins to that desired by the operator. That is, the key 66 causes forward rotation of the motor 33, whereby a lens 4 to be described is moved leftwardly as shown in FIG. 6A. The key 67 causes reverse rotation of the motor 33, whereby the lens 4 is moved rightwardly as shown in FIG. 6B. The amount of rotation of the motor 33 and accordingly the amount of lateral movement of the lens is controlled by the key group 69. That is, the lens 4 is laterally moved by a distance corresponding to one or more numeric keys of the key group 69 which have been selected by the operator. The operator may depress one or more keys corresponding to the desired width of the binding margin.

Also, when the key 66 or 67 is depressed, the motors 28 and 56 to be described are rotated to vary the copying magnification. When the motor 28 is rotated, the lens 4 is moved in the magnification direction and, when the motor 56 is rotated, a mirror 3 to be described is moved to change its forward movement starting point position. The amount of rotation of the motors 28 and 56 and accordingly, the amount of movement of the lens 4 in the magnification direction and the amount of movement of the mirror 3 are controlled by the key group 69. That is, the lens 4 is moved in the magnification direction by a distance corresponding to said one or more numeric keys selected by the operator, and the mirror 3 is also moved by the distance corresponding to said one or more numeric keys.

Also, when the key 68 is depressed, the motors 28 and 56 are rotated to move the lens 4 in the magnification direction and move the mirror 3. The amounts of movement of the lens 4 and the mirror 3 are also controlled by the key group 69 similarly to what has been previously described. When the key 68 is depressed, the key group 69 controls a timer 60 which in turn controls the driving of a pair of register rollers 14 to be described. That is, the set time of the timer 60 is changed correspondingly to said one or more numeric keys selected by the operator.

The desired width of the binding margin set by the key group 69 is displayed by a display device 70. For example, if the numeric key "5" is depressed, "05" is displayed on the display device 70 and a 5 mm width of binding margin is provided on the transfer paper, and if the numeric keys "2" and "5" are successively depressed, "25" is displayed on the display device 70 and a 25 mm width of binding margin is provided on the transfer paper.

Designated by S in FIG. 1 is the original scanning direction, and mirrors 2 and 3 to be described are moved forward in the direction of arrow S. The original O is placed on the origianl supporting table 1 with one side edge O′ thereof registered to one end 1′ of the table 1 and with the fore end O″ thereof registered to an end edge 1″ perpendicular to the end 1′.

Figure 2:
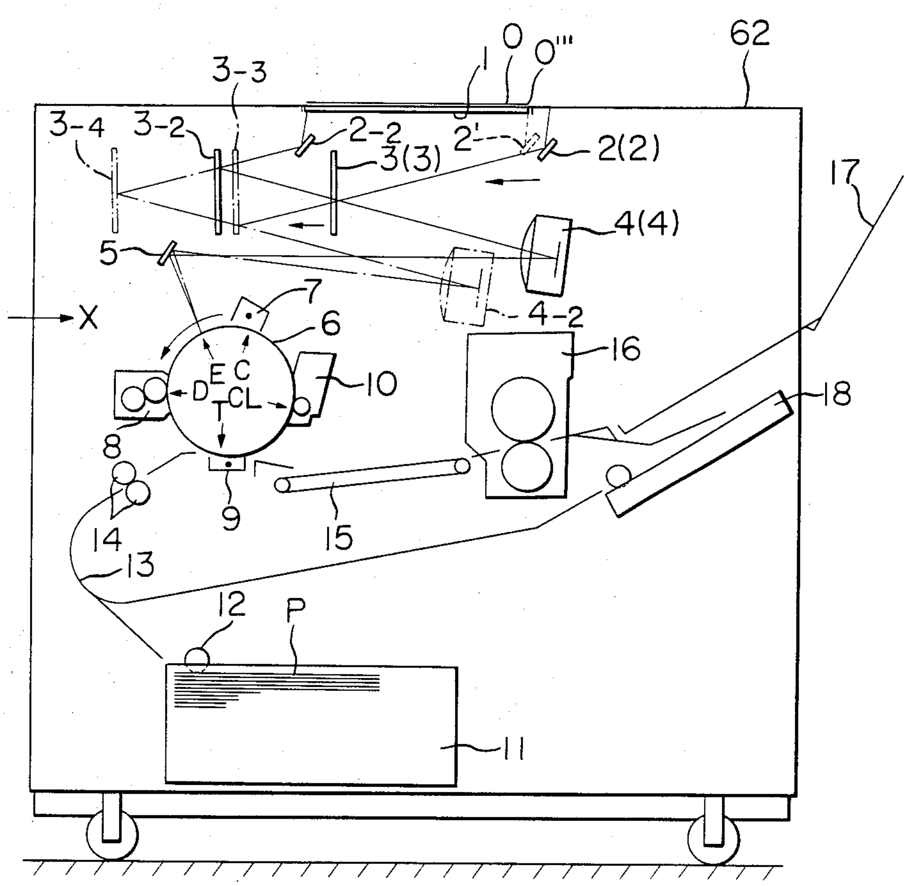
FIG. 2 illustrates the arrangement of various means in an embodiment of the present invention.

Referring now to FIG. 2, the original O to be copied is placed on the transparent original supporting table 1. This original is illuminated by a lamp, not shown, and is scanned by movable mirrors 2 and 3. That is, the mirrors 2 and 3 are moved forward or leftward at a velocity ratio of 1:½ from the forward movement starting point positions (2) and (3), respectively, and scan the original O during this forward movement. When the original scanning is terminated and the mirrors 2 and 3 arrive at their respective forward movement terminating points 2—2 and 3-2, respectively, the mirrors 2 and 3 are moved backward to return to their respective forward movement starting point positions. During the above-described original scanning, the light from the original O is reflected by the mirrors 2 and 3 in succession and enters a lens having mirror therein, i.e., an in-mirror lens 4. The imaging light beam which has emerged from the lens 4 is reflected by a stationary mirror 5 and impinges on an electrophotographic photosensitive drum 6 at an exposure station E, the drum being rotated in the direction of arrow. That is, the drum 6 is slit-exposed to the optical image of the original. Before this slit-exposure, the drum 6 has been uniformly charged by a charger 7 at a charging station C. Accordingly, by the slit-exposure to the optical image, an electrostatic latent image of the original is formed on the drum 6. This latent image is developed by a developing device 8 at a developing station D. The visible toner image obtained on the drum 6 through the developing step is transferred onto transfer paper P under the action of an image transfer charger 9 at a transfer station T. After the image transfer, the drum 6 has its surface cleaned by a cleaner 10 at a cleaning station CL, thus becoming available for another cycle of image formation process.

The transfer paper P is fed from a transfer paper supporting deck 11 by a feed roller 12 and comes to a pair of register rollers 14. When the leading end edge of the transfer paper P has arrived at the pair of rollers 14, the rollers are stopped from rotating. Accordingly, the leading end edge of the transfer paper P strikes against the pair of rollers 14 and the transfer paper temporally stops advancing. Thereafter, the pair of rollers 14 start rotating, whereby the transfer paper re-starts advancing. The pair of rollers 14 transport the transfer paper P to the transfer station T at a velocity equal to the peripheral velocity of the drum 6. The point of time at which the rotation of the pair of rollers 14 is started is variable. Thus, the time between the point of time at which the fore end edge O‴ of the original O is scanned by the mirror 2 (the point of time at which the mirror 2 has come to a position 2′ whereat it can see the fore end edge O‴ of the original O) and the point of time at which the leading end edge P‴ of the transfer paper P arrives at the transfer station is variable. At the point of time whereat the fore end edge O‴ of the original has been scanned, a latent image of the fore end edge O‴ of the original is formed on the drum 6.

After the image transfer, the transfer paper P is conveyed to a fixing device 16 by a belt 15. The fixing device 16 fixes the toner image on the transfer paper P. After the fixation, the transfer paper P is discharged onto a tray 17. However, when it is desired to obtain copy images on both sides of the transfer paper, the transfer paper may be directed to an intermediate tray 18 after the fixation of a first side of the transfer paper by depression of the both-side copy instructing key 65, and then it may be again fed in accordance with a second side copy operation so that the back side of the transfer paper comes into contact with the photosensitive drum, whereby both-side copy may be obtained through a process similar to what has been previously described.

Now, in the apparatus of the present invention, a binding margin of any width can be formed on the side edge portion or the leading end edge portion of transfer paper. In order that the image of an original may be formed fully on the area of the transfer paper except for the set binding margin, in the apparatus of the present invention, the magnification of the copy image relative to the original, namely, the copying magnification, is changed correspondingly to the set width of the binding margin.

In order that the copying magnification may be changed correspondingly to the set width of the binding margin, in the embodiment of FIG. 2, the lens 4 is movable in the magnification direction. (The term "magnification direction" used herein refers to a direction in which the lens is moved, whereby the magnification of the image of an original formed on the drum 6 can be changed. That is, by the lens being moved in the magnification direction, the length of the optical path between the original and the lens and the length of the optical path between the lens and the drum can be changed.)

In order that a binding margin may be formed on the side edge portion of transfer paper, in the apparatus of FIG. 2, the lens 4 is movable also in a direction perpendicular to the rotational direction of the drum 6 (this direction is also perpendicular to the original scanning direction).

Figure 3:
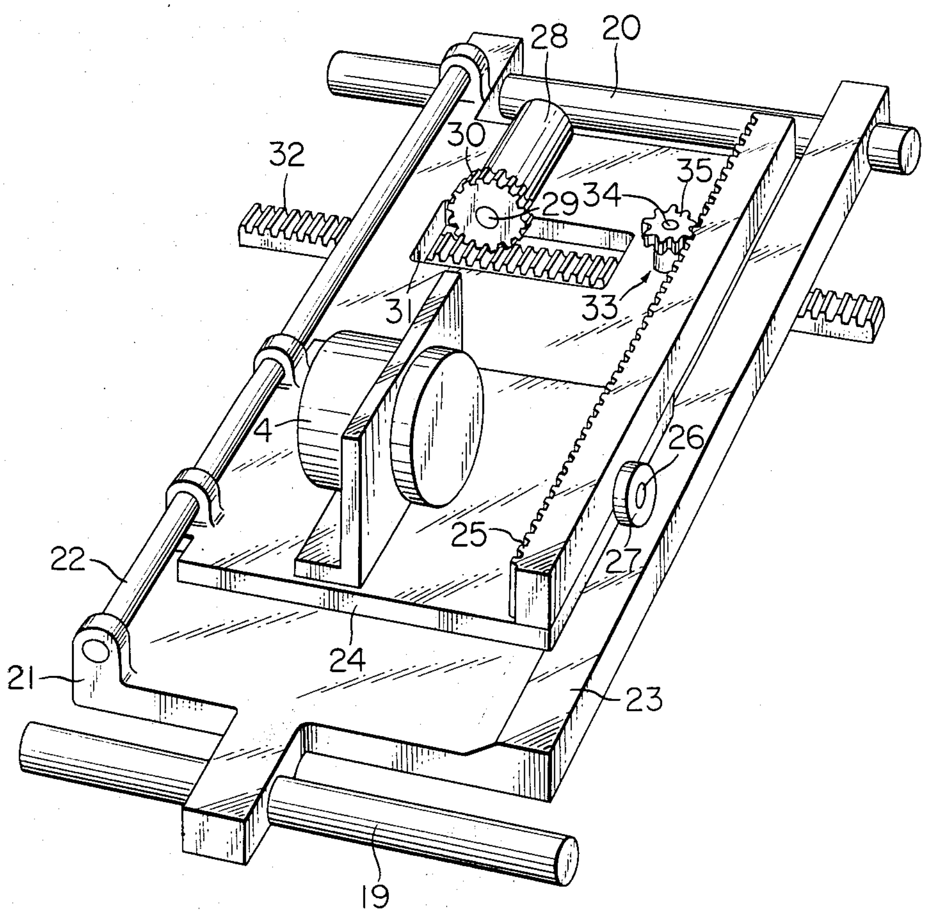
FIG. 3 illustrates a mechanism for moving the lens.

FIG. 3 shows a mechanism for moving the lens 4. In FIG. 3, a first moving carriage 21 is slidably supported on a pair of guide rails 19 and 20 disposed along the magnification direction. A second moving carriage 24 for fixedly supporting the imaging lens 4 is slidably supported on a guide rail 22 disposed on one side of the upper surface of the first moving carriage 21 in a direction perpendicular to the rotational direction of the drum and a projected edge 23 provided on the other side of said upper surface in the same direction. A rack 25 extending parallel to the rail 22 is fixed to one side edge of the second moving carriage 24, and a roller 27 mounted to the rack 25 by means of a shaft 26 is slidably placed on the upper surface of the projected edge 23 of the first moving carriage 21.

A servomotor 28 is mounted on the upper surface of the first moving carriage 21, and a gear 30 fixed to the output shaft 29 of the servomotor is exposed from an opening 31 formed in the first moving carriage 21 and meshes with a rack 32 fixed to the apparatus body and extending parallel to the guide rails 19 and 20.

A servomotor 33 is further mounted on the upper surface of the first moving carriage, and a gear 35 fixed to the output shaft 34 of the servomotor 33 meshes with the rack 25 of the second moving carriage 24.

In the foregoing, by the motor 28 being operated, the first moving carriage 21 is guided by the guide rails 19 and 20 and moved in the magnification direction. That is, the lens 4 is displaced in the magnification direction to change the length of the optical path between the original and the lens and the length of the optical path between the lens and the drum.

Also, by the motor 33 being operated, the second moving carriage 24 is guided by the guide rail 22 and the projected edge 23 of the carriage 21 and moved on the carriage 21 in a direction perpendicular to the rotational direction of the drum. That is, the lens 4 is displaced in the direction perpendicular to the rotational direction of the drum. The length of the optical path between the original and the lens and the length of the optical path between the lens and the drum are not changed by such displacement of the lens, but the position of the image of the original formed on the drum is displaced in the direction perpendicular to the rotational direction of the drum.

The motors 28 and 33 may be operated at a time, or the motor 33 may be operated after the operation of the motor 28 has been terminated, or the motor 28 may be operated after the operation of the motor 33 has been terminated.

Now, where the lens 4 is a fixed focus lens, to change the magnification of the image, it is desirable that not only the lens 4 be displaced in the magnification direction but also the relative positional relation between the mirrors 2 and 3 be changed to change the length of the optical path between the original and the lens and thereby bring it into a length corresponding to the magnification to be set to correct the amount of variation by the displacement of the lens, or that the position of the mirror 5 be changed to change the length of the optical path between the lens and the drum and thereby bring it into a length corresponding to the magnification to be set to correct the amount of variation by the displacement of the lens. In FIG. 2, the forward movement starting point position of the second mirror 3 is changed to thereby change the relative positional relation between the first and second scanning mirrors 2 and 3. The driving mechanism for the mirrors 2 and 3 will now be described by reference to FIG. 4.

Figure 4:
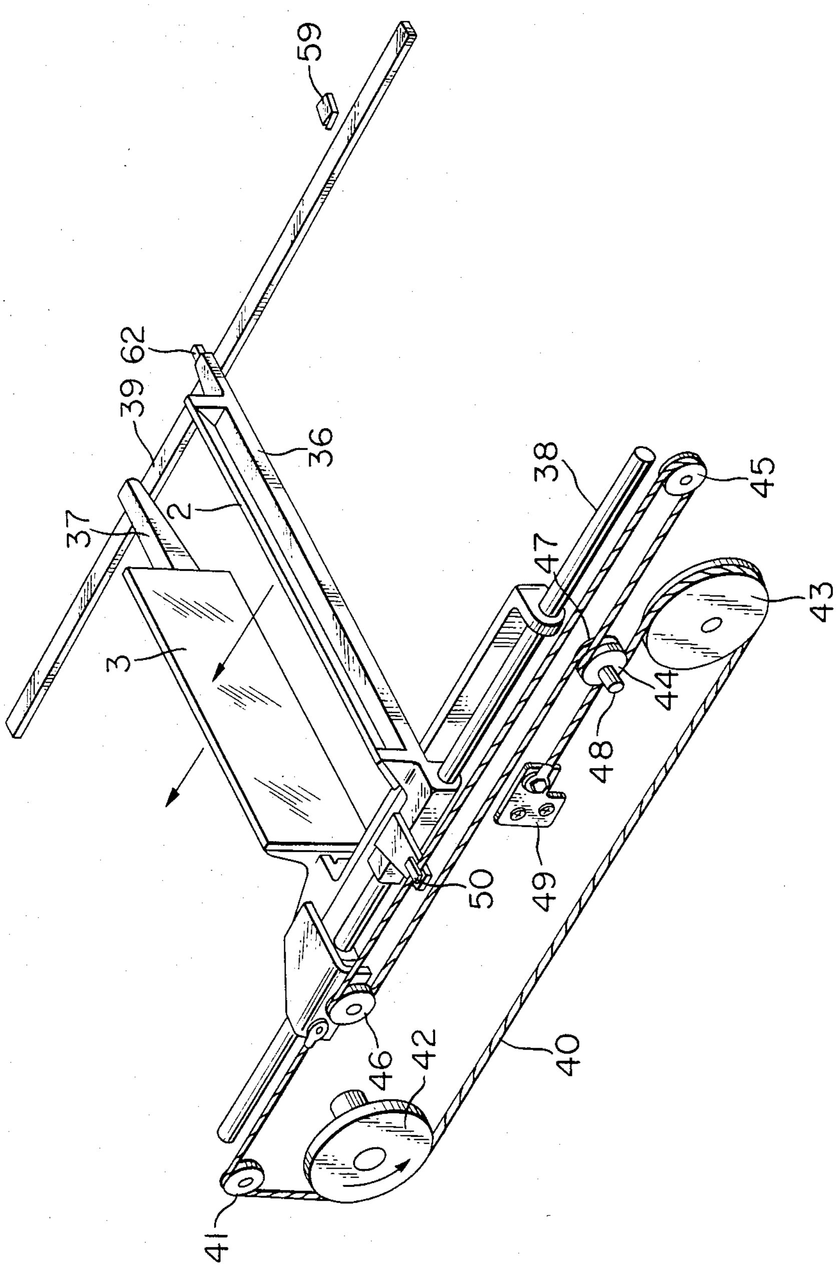
FIG. 4 illustrates the scanning-moving mechanism of the mirrors.

In FIG. 4, first and second mirror supporting beds 36 and 37 for supporting the mirrors 2 and 3 respectively are slidably supported on guide rails 38 and 39 disposed parallel to the original supporting table 1. Wire 40 having one end secured to the second mirror supporting bed 37 is passed over a pulley 41 positionally fixed to the apparatus body, a drive pulley 42, a pulley 43 positionally fixed to the apparatus body, a position-adjustable pulley 44, a pulley 45 positionally fixed to the apparatus body, a pulley 46 provided on the second mirror supporting bed 37, and a pulley 47 rotatably supported on a shaft 48 common to the pulley 44, and the other end of the wire 40 is secured to a portion 49 of the apparatus body. Between the pulleys 45 and 46, the first mirror supporting bed 36 and the wire 40 are fixedly connected together by a member 50.

In the above-described construction, when the drive pulley 42 is rotated counter-clockwisely, the pulley 46 functions similarly to a running block and the first mirror supporting bed 36 and the second mirror supporting bed 37 are moved forward at a velocity ratio of $1:\frac{1}{2}$. When the original scanning is terminated by this forward movement, the pulley 42 is rotated clockwisely, whereby the mirrors 2 and 3 are moved backward to return to their forward movement starting point positions. The velocity of the counter-clockwise rotation of the pulley 42 is variable correspondingly to the set copying magnification. That is, the forward movement velocity (the original scanning speed) of the mirror 2 is given by v/m, and the forward movement velocity of the mirror 3 is given by v/2m, where v is the peripheral velocity of the drum 6 and m is the set copying magnification.

Figure 5:
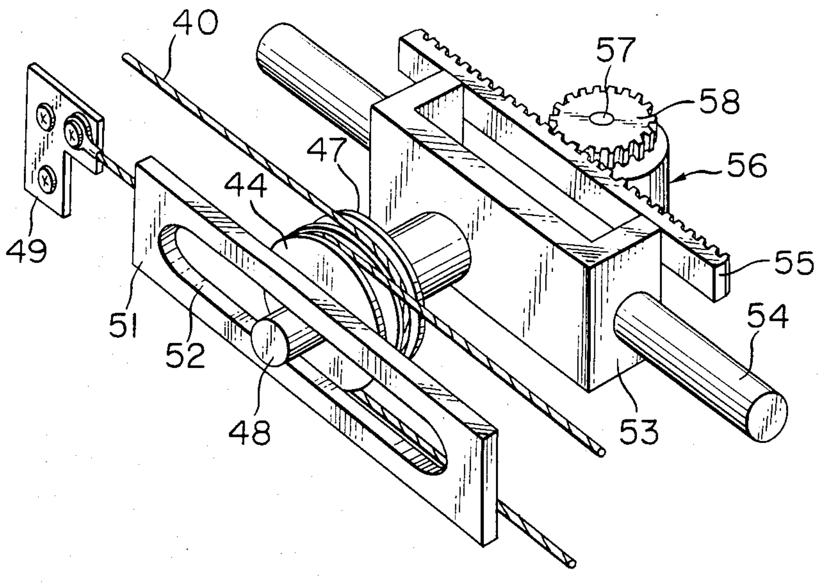
FIG. 5 illustrates a pulley displaying mechanism.

In the device of FIG. 4, the forward movement starting point position of the second mirror 3 can be changed by changing the positions of the pulleys 44 and 47. A mechanism for displacing the pulleys 44 and 47 will now be described by reference to FIG. 5.

The shaft 48 of the pulleys 44 and 47 has one end slidably supported in a slot 52 formed in a guide plate 51 and the other end secured to a pulley supporting member 53. The supporting member 53 is slidably supported on a guide rail 54. A rack 55 extending parallel to the guide rail 54 is fixed to the supporting member 53, and a gear 58 fixed to the output shaft 57 of a servomotor 56 is in mesh engagement with the rack 55.

In the above-described construction, when the motor 56 is operated, the pulleys 44 and 47 are displaced, whereby the forward movement starting point position of the second mirror 3 is changed, for example, to 3—3 of FIG. 2. When the drive pulley 42 is then rotated, the first mirror reciprocates between the position (2) of FIG. 2 and the position 2—2, and in synchronism with the first mirror, the second mirror reciprocates between the position 3—3 of FIG. 2 and the position 3-4. In any case, during the forward movement of the mirrors 2 and 3, the original O is scanned and the image thereof is projected upon the drum 6.

In the foregoing, if the operation mode of the apparatus is the normal mode (the operation mode in which formation of a binding margin on the end portion of transfer paper is not instructed and a copy image equal in magnification to the original is formed), then the lens 4 lies at the solid-line position (4) of FIG. 2 and the forward movement starting point position of the second mirror 3 is the position (3) of FIG. 2. At this time, the length of the optical path between the original and the lens and the length of the optical path between the lens and the drum are 2·f (f is the focal length of the lens 4).

On the other hand, if the operation mode of the apparatus is a binding margin formation mode, the key 66 or 67 or 68 of FIG. 1 and one or two desired keys of the key group 69 are depressed. Thus, the key 66 or 67 or 68 and the key group 69 control the motors 28 and 56, thereby controlling movement of the lens 4 and the second mirror 3. That is, the key 66 or 67 or 68 and the key group 69 move the forward movement starting point positions of the lens 4 and mirror 3 to such positions that the length of the optical path between the original and the lens is $(2W-l/W-l)\cdot f$ and the length of the optical path between the lens and the drum is $(2W-l/W)\cdot f$. That is, the lens 4 is changed to the position 4-2 and the forward movement starting point position of the second mirror 3 is changed to 3—3. At this time, the magnification of the image of the original is $W-l/W$, that is, the difference between the width of the transfer paper and the width of the binding margin, divided by the width of the original. For convenience of description, explanation is made with respect to a case where both the width of the original and the width of the transfer paper are W, but the present invention is also applicable to a case where the width of the original and the width of the transfer paper differ from each other. The above-mentioned l is the width of the binding margin set by the key group 69.

The binding margin formation mode consists of two different modes. In a first mode, a binding margin is formed on the side edge portion of transfer paper and, in a second mode, a binding margin is formed on the leading end edge portion of transfer paper. The first binding margin formation mode is designated by depressing the key 66 or 67 and the second binding margin formation mode is designated by depressing the key 68.

In the embodiment illustrated, when the second binding margin formation has been designated, the lens 4 is moved only in the magnification direction. That is, the motor 28 of FIG. 4 is operated but the motor 33 is not operated. However, when the first binding margin formation mode has been designated, the lens 4 is displaced in both the magnification direction and the direction perpendicular to the rotational direction of the drum 6. That is, both of the motors 28 and 33 of FIG. 4 are operated. Thus, the amount of rotation of the motor 33 is controlled by the key group 69 as previously described, and the amount of displacement of the lens 4 in the direction perpendicular to the rotational direction of the drum by the operation of the motor 33 is given by $Wl/2(2W-l)$. The key 66 causes the motor 33 to rotate in the forward direction, whereby the lens 4 is displaced leftwardly as seen in FIG. 6A. Accordingly, a binding margin $F_1$ is formed on the right side edge portion of transfer paper P. On the other hand, the key 67 causes the motor 33 to rotate in the reverse direction, whereby the lens 4 is displaced rightwardly as seen in FIG. 6B. Accordingly, a binding margin $F_2$ is formed on the left side edge portion of transfer paper. FIG. 6C shows a case where no binding margin is formed.

Now, in FIGS. 6A, 6B and 6C, the transfer paper P contacts the area $A_1$(width W) of the drum 6 at the transfer station. In the case of the aforementioned normal mode, as shown in FIG. 6C, the ono-to-one magnification image of the original is formed on the area $A_1$. In this case, the image of the right side edge O' of the original O is projected upon the left end $A_1'$ of the area $A_1$ and the image of the left side edge O'' of the original O is projected upon the right end $A_1''$ of the area $A_1$. Thus, the image of the original is formed on the transfer paper P from the right end P' to the left end P'' thereof.

In FIG. 6A, the image of the right side edge O' of the original O is projected upon the left end $A_1'$ of the area $A_1$ while the image of the left side edge O'' of the original O is projected upon a point $A_2'$ in the area $A_1$. That is, the image of the original (reduced image) is formed on an area $A_2$ from a point $A_1'$ to the point $A_2'$ and the image of the original is not formed on an area $A_3$ from the point $A_2'$ to a point $A_1''$. On the other hand, the transfer paper P contacts the entire width the area $A_1$. Accordingly, an image $W-l/W$ times the original O is formed on that area $I_1$ of the transfer paper P which contacts the area $A_2$. The image of the original is not formed on that area $F_1$ of the transfer paper P which contacts the area $A_3$, and this area $F_1$ is utilized as the binding margin. Of course, the width of the area $A_3$ is l.

Likewise, in FIG. 6B, the image of the left side edge O'' of the original O is projected upon the right end A'' of the area A, while the image of the right side edge O' of the original O is projected upon a point $A_4'$ in the area A. That is, the image of the original (reduced image) is formed on the area $A_4$ from a point $A_1''$ to the point $A_4'$, and the image of the original is not formed on the area $A_5$ from the point $A_4'$ to the point $A_1'$. On the other hand, the transfer paper P contacts the entire width of the area $A_1$. Accordingly, an image $W-l/W$ times the original O is formed on the area $I_2$ of the transfer paper P which contacts the area $A_4$. The image of the original is not formed on the area $F_2$ of the transfer paper P which contacts the area $A_5$ and this area $F_2$ is utilized as the binding margin. Of course, the width of the area $A_5$ is l.

In any case, in FIGS. 6A and 6B, the direction of displacement differs, but by the control of the motor 33 by the key group 69, the lens 4 is displaced from the position of FIG. 6C by a distance $Wl/2(2W-l)$ with respect to a direction parallel to the rotational axis of the photosensitive drum 6 (a direction perpendicular to the original scanning direction). Also, in all of FIGS. 6A, 6B and 6C, the transfer paper P is in contact with the same area $A_1$ of the drum 6.

Figure 7A:
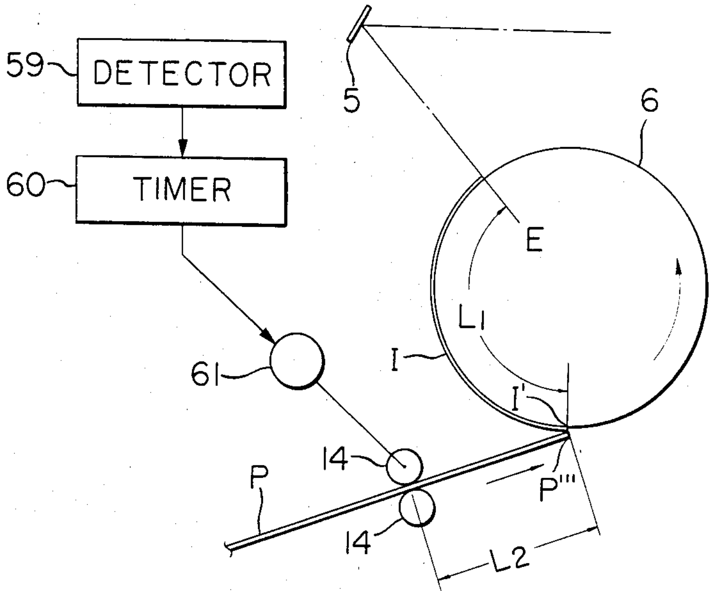
FIGS. 7A and 7B illustrate transfer medium conveying means.
Figure 7B:
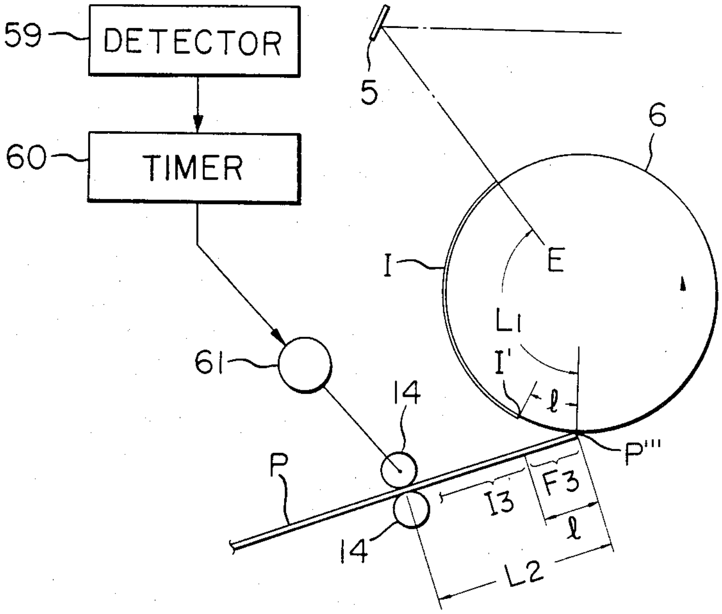

In the aforementioned normal mode and the first binding margin formation mode, as shown in FIG. 7A, the leading end edge I' of the original image I formed on the drum 6 and the leading end edge P''' of the transfer paper P are substantially coincident with each other at the transfer station T. That is, the image of the original is formed on the leading end edge of the transfer paper P. On the other hand, in the second binding margin formation mode, a binding margin $F_3$ of desired width l can be formed on the leading end portion of the transfer paper P. In this case, as shown in FIG. 7B, the leading end edge P''' of the transfer paper P arrives at the transfer station T before the leading end edge I of the original image I formed on the drum 6 arrives at the transfer station T. An image $W-l/W$ times the original O is formed on the transfer paper P at an area thereof after the distance l from the leading end edge P''' thereof, namely, an area $I_3$.

In FIGS. 7A and 7B, let $L_1$ be the rotational distance of the drum 6 from the exposure station E to the transfer station T, or in other words, the circumferential length of the drum 6 between the stations E and T, $L_2$ be the movement distance of the transfer paper P from the pair of register rollers 14 to the transfer station T, and v be the peripheral velocity of the drum 6 and the conveyance velocity of the transfer paper P by the pair of rollers 14.

The time required from the point of time at which the photosensitive drum 6 is exposed to the image of the fore end O''' of the original until the image of the fore end O''' of the original arrives at the transfer station T is $L_1/v$. Also, the time required from the point of time at which the leading end edge P''' of the transfer paper P starts from the position of the pair of rollers 14 until it arrives at the transfer station T is $L_2/v$. Accordingly, by the driving of the pair of rollers 14 being started at a point of time later by a time $(L_1-L_2)/v$ than the point of time at which the drum 6 has been exposed to the image of the fore end O''' of the original, the transfer paper P is conveyed so that, as shown in FIG. 6A, the leading end edge P''' of the tranfer paper P is coincident with the leading end edge I' of the image of the original at the transfer station T. In contrast, if the driving of the pair of rollers 14 is started at a point of time later by a time $(L_1-l-L_2)/v$ than the point of time at which the drum 6 has been exposed to the image of the fore end O''' of the original, the leading end edge P''' of the transfer paper P will arrive at the transfer station T earlier by a time l/v than the point of time at which the leading end edge I' of the image of the original on the drum 6 arrives at the transfer station T. That is, at the point of time whereat the leading end edge P''' of the transfer paper has arrived at the transfer station T, the leading end edge I' of the image of the original has just arrived at a point of distance l upstream of the transfer station T with respect to the rotational direction of the drum. Consequently, the image of the original is not formed on the area $F_3$ of width l in the leading end edge portion of the transfer paper, and this area $F_3$ is utilized as the binding margin.

The point of time at which the driving of the pair of register rollers 14 is started is controlled in the following manner. In FIGS. 7A and 7B, reference numeral 59 designates a detector such as a microswitch or the like. The detector 59 is disposed in proximity to the movement path of the first scanning mirror 2, as shown in FIG. 4. When the first mirror 2 has arrived at a position for scanning the fore end O''' of the original (the position 2' in FIG. 2) after it has started its forward movement from its forward movement starting point position (2), a cam 62 provided on the first mirror supporting bed 36 bears against the detector 59 to cause the latter to produce a signal. That is, the detector 59 produces a signal at a point of time whereat the scanning of the original O has been started, or in other words, at a point of time whereat the drum 6 has been exposed to the image of the fore end O''' of the original at the exposure station E. Timer means 60 is energized by this signal. This timer means is a conventional one whose set time is variable, and its set time is controlled by the key group 69. After the set time has elapsed from the receipt of the signal from the detector 59, the timer 60 energizes a clutch 61 for transmitting the drive force from an unshown motor to the pair of rollers 14. When the clutch 61 is energized, the pair of rollers 14 start rotating, whereby the transfer paper P begins to be conveyed toward the transfer station T. Thus, the time set by the timer 60 is said $(L_1-L_2)/v$ where a binding margin is not formed on the leading end edge portion of the transfer paper P, and is controlled to said $(L_1-l-L_2)/v$ by the key group 69 where a binding margin of width l is formed on the leading end edge portion of the transfer paper P. In the case of FIG. 7A, the timer 60 starts to drive the pair of rollers 14 in a time $(L_1-L_2)/v$ after the detector 59 has detected the start of the scanning of the original. In the case of FIG. 7B, the timer 60 starts to drive the pair of rollers 14 in a time $(L_1-l-L_2)/v$ after the detector 59 has detected the start of the scanning of the original.

Where the movement velocities of the mirrors 2 and 3, i.e., the original scanning speed, is changed correspondingly to the set copying magnification as previously described, it is simplest to control the point of time at which the driving of the pair of rollers 14 is started with the point of time at which the original scanning is started as the standard as described above. This is because the time from after the mirrors 2 and 3 have started to move forward from their forward movement starting point positions until the original scanning is started (the time required for the mirrors 2 and 3 to move over the preparatory running section preceding to the original scanning section) varies correspondingly to a variation in the original scanning speed and therefore it becomes cumbersome to set the length of time if the point of time at which the driving of the pair of rollers 14 is started is controlled, for example, with the point of time at which the mirrors 2 and 3 start their forward movement or the point of time at which rotation of the drum 2 is started before the mirrors 2 and 3 start their forward movement as the standard. Particularly, in a case where the width l of the binding margin is variable, this cumbersomeness would be increased. However, design may also be made such that the point of time at which the driving of the pair of rollers 14 is started is controlled with the point of time at which forward movement of the mirrors 2 and 3 is started or the point of time at which rotation of the drum 2 is started as the standard point of time. In short, the length of time (including 0) between the point of time at which the leading end edge P''' of the transfer paper arrives at the transfer station T and the point of time at which the leading end edge I' of the image arrives at the transfer station may be varied in accordance with whether a binding margin $F_3$ is formed on the leading end edge portion of the transfer paper or, where the binding margin $F_3$ is formed, in accordance with the magnitude of the width l of the binding margin $F_3$.

In the above-described embodiment, a fixed focus lens is used as the lens 4, but a zoom lens is also usable as the lens 4. Where a zoom lens is used as the lens 4, when the image magnification is changed correspondingly to the width of the binding margin, the position of the lens need be changed but the relative positional relation between the mirrors 2 and 3 need not be changed. Accordingly, in such case, the mechanism described in connection with FIG. 5, namely, the mechanism for displacing the pulleys 44 and 47, is not necessary.

Also, even in the case of the conditions of FIGS. 6A and 6B, if the set time of the timer 60 is changed, a binding margin can be formed not only on the side edge portion of the transfer paper but also on the leading end edge portion thereof.

Further, if design is made such that the timer 60 is not controlled by the key 68 and the key group 69, that is, the set time of the timer 60 is rendered to the same time $(L_1-L_2)/v$ as that described in connection with FIG. 7A in any operation mode and the lens 4 and, if required, the mirror 3 are made movable by the key 68 and the key group 69, then a binding margin of width l will be formed on the trailing end edge portion of the transfer paper P by depressing the key 68 and depressing one or two keys of the key group 69, because although the magnification of the image of the original formed on the drum is $(W-l)/W$, the transfer paper P is conveyed to the transfer station T so that the leading end edge P''' thereof is coincident with the leading end edge I' of the original image I.

The term "width of transfer paper" used herein refers to the length of the transfer paper with respect to a direction perpendicular to the conveyance direction of the transfer paper where a binding margin is formed on the side edge portion of the transfer paper, and refers to the length of the transfer paper with respect to the conveyance direction of the transfer paper where a binding margin is formed on the leading end edge portion or the trailing end edge portion of the transfer paper. Also, the term "width of the original" refers to the length of the original with respect to a direction perpendicular to the original scanning direction where a binding margin is formed on the side edge portion of the transfer paper, and refers to the length of the original with respect to the original scanning direction where a binding margin is formed on the leading end edge portion or the trailing end edge portion of the transfer paper. Also, the term "width of the binding margin" should be understood similarly to what has been described just above.

We claim:

1. A copying apparatus capable of forming a binding margin at an edge portion of a transfer medium, the width of said binding margin being variable, said apparatus comprising:

a movable photosensitive medium;

a variable magnification projection optical system having a lens for projecting the optical image of an original to be copied onto said photsensitive medium;

transfer means for transferring the image of the original to the transfer medium at a transfer station;

instructing means for instructing the formation of a binding margin on a side edge portion of the transfer medium and the width of the binding margin to be formed;

a first motor responsive to the instruction of said instructing means for displacing said lens in a magnification direction so as to change the magnification of the image of the original in accordance with the selected width of the binding margin; and a second motor responsive to the instruction of said instructing means for displacing said lens in a direction perpendicular to direction of movement of the photosensitive medium by a distance corresponding to the selected width of the binding margin.

2. A copying apparatus according to claim 1, further comprising:

a first movable carriage driven by said first motor;

first guide means for guiding said first carriage along the optical path;

a second movable carriage driven by said second motor; and second guide means for guiding said second carriage. in the direction perpendicular to the direction of movement of the photosensitive medium; one of said first and second movable carriages being movably mounted on the other carriage, said lens being mounted on said one of the first and second movable carriages, and the guide means for said one of the first and second carriages being mounted on the other carriage.

3. A copying apparatus capable of forming a binding margin at an edge portion of a transfer medium, the width of said binding margin being variable, said apparatus comprising:

a movable photosensitive medium;

scanning means movable along a path for scanning an original, said path including a preparatory scanning section and an original scanning section;

a lens for projecting the optical image of the scanned original onto said photosensitive medium;

transfer means for transferring the image of the original onto the transfer medium at a transfer station;

feeding means for feeding the transfer medium to the transfer station;

instructing means for instructing the formation of a binding margin on the leading edge portion of the transfer medium and the width of the binding margin to be formed;

variable timer means for controlling the operation of said feeding means, said variable timer means changing the time interval from when the leading edge of the original has been scanned until the leading edge of the transfer medium arrives at the transfer station in accordance with the selected width of the binding margin; and lens displacing means responsive to the instruction of said instructing means for displacing said lens in a magnification direction so as to cause the magnification of the optical image of the original projected onto said photosensitive medium to correspond to the selected width of the binding margin.

4. A copying apparatus according to claim 3, further comprising:

detecting means for detecting the position of said scanning means and generating a signal when said scanning means reaches a predetermined position in said path, wherein said detecting means detects that said scanning means reaches a position for scanning the leading edge of the original, and said variable timer means operates in response to the signal generated by said detecting means.

5. A copying apparatus according to claim 4, further comprising scanning speed changing means for changing the speed of said scanning means corresponding to said ratio.

6. A copying apparatus according to claim 5, further comprising a supporting table to support the original, said table having an edge for positioning the leading edge of the original.

7. A copying apparatus according to one of claims 4, 5 or 6, wherein said variable timer means actuates said feeding means at a time delayed by the time corresponding to said selected width of the binding margin from the time at which said sensing means produced said signal.

* * * * *